United States Patent
Handige Shankar

(10) Patent No.: US 9,699,064 B2
(45) Date of Patent: Jul. 4, 2017

(54) METHOD AND AN APPARATUS FOR NETWORK STATE RE-CONSTRUCTION IN SOFTWARE DEFINED NETWORKING

(71) Applicant: Telefonaktiebolaget L M Ericsson (publ), Stockholm (SE)

(72) Inventor: Ganesh Handige Shankar, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 59 days.

(21) Appl. No.: 14/804,054

(22) Filed: Jul. 20, 2015

(65) Prior Publication Data

US 2017/0026270 A1    Jan. 26, 2017

(51) Int. Cl.
| | |
|---|---|
| *H04L 12/28* | (2006.01) |
| *H04L 12/751* | (2013.01) |
| *H04L 12/24* | (2006.01) |
| *H04L 12/721* | (2013.01) |
| *H04L 12/715* | (2013.01) |
| *H04L 12/26* | (2006.01) |

(52) U.S. Cl.
CPC .......... *H04L 45/02* (2013.01); *H04L 41/0672* (2013.01); *H04L 41/22* (2013.01); *H04L 43/04* (2013.01); *H04L 43/045* (2013.01); *H04L 43/067* (2013.01); *H04L 43/18* (2013.01); *H04L 45/38* (2013.01); *H04L 45/64* (2013.01)

(58) Field of Classification Search
None
See application file for complete search history.

(56) References Cited

U.S. PATENT DOCUMENTS

| | | | |
|---|---|---|---|
| 2012/0051229 A1 | 3/2012 | Feldmann et al. | |
| 2012/0259793 A1* | 10/2012 | Umansky | G06Q 10/06 705/348 |
| 2015/0089331 A1* | 3/2015 | Skerry | H04L 43/0823 714/799 |

(Continued)

OTHER PUBLICATIONS

Ahsan Arefin et al., "Diagnosing Data Center Behavior Flow by Flow", Proceedings of the International Conference on Distributed Computing Systems, IEEE Computer Society, Jul. 8, 2013, 10 pages.

(Continued)

*Primary Examiner* — Minh-Trang Nguyen
(74) *Attorney, Agent, or Firm* — Nicholson De Vos Webster & Elliott LLP

(57) ABSTRACT

Techniques are disclosed for re-construction and tracking of a forwarding state of a network device in communication with a network controller in a Software Defined Network (SDN). The techniques include receiving control messages, where the control messages are messages transmitted from a network controller to a network device. The techniques further includes extracting a subset of control messages from the control messages, where each control message from the subset of control messages caused a change in a forwarding state of the network device; generating, based on the extracted subset of control messages, a directed graph, wherein the directed graph is representative of the forwarding state of the network device; and causing the directed graph to be displayed on a display device.

18 Claims, 11 Drawing Sheets

(56) References Cited

U.S. PATENT DOCUMENTS

| | | | | |
|---|---|---|---|---|
| 2015/0172185 A1* | 6/2015 | Zhang | .................. | H04L 45/42 370/389 |
| 2015/0249587 A1* | 9/2015 | Kozat | .................. | H04L 43/10 370/222 |

OTHER PUBLICATIONS

Bolin Scott et al., "Troubleshooting Blackbox SDN Control Software with Minimal Causal Sequences", Computer Communication Review, ACM, vol. 44, No. 4, Aug. 17, 2014, pp. 395-406.

Handigol et al., "Where is the Debugger for my Software-Defined Network?", HotSDN'12, ACM, Aug. 13, 2012, 6 pages.

Canini et al., "A NICE Way to Test OpenFlow Applications", NSDI. vol. 12. 2012, 14 pages.

Durairajan et al., "Controller-agnostic SDN Debugging", CoNext'14, ACM, Dec. 2-5, 2014, 7 pages.

Chris Hoffman, "How to Use Wireshark to Capture, Filter and Inspect Packets", Oct. 14, 2014, 8 pages.

Khurshid et al., "VeriFlow: Verifying Network-Wide Invariants in Real Time", In proceedings of ACM Sigcomm HotSDN Workshop, 2012, pp. 1-13.

J. Postel, "User Datagram Protocol," Aug. 28, 1980, 3 pages, RFC: 768.

"Transmission Control Protocol, DARPA Internet Program Protocol Specification," Sep. 1981, 91 pages, RFC: 793, Information Sciences Institute, University of Southern California, Marina del Rey, California.

C. Hedrick, "Routing Information Protocol," Jun. 1988, 33 pages, Network Working Group, Request for Comments: 1058.

David Oran, "OSI IS-IS Intra-domain Routing Protocol," Feb. 1990, 157 pages, Network Working Group, Request for Comments: 1142.

T. Socolofsky, et al., "A TCP/IP Tutorial," Jan. 1991, 28 pages, Network Working Group, Request for Comments: 1180.

G. Malkin, et al., "RIPng for IPv6," Jan. 1997, 19 pages, Network Working Group, Request for Comments: 2080.

R. Braden, et al., "Resource ReSerVation Protocol (RSVP)—Version 1 Functional Specification," Sep. 1997, 112 pages, Network Working Group, Request for Comments: 2205.

J. Wroclawski, "The Use of RSVP with IETF Integrated Services," Sep. 1997, 33 pages, Network Working Group, Request for Comments: 2210.

J. Wroclawski, "Specification of the Controlled-Load Network Element Service," Sep. 1997, 19 pages, Network Working Group, Request for Comments: 2211.

S. Shenker, et al., "Specification of Guaranteed Quality of Service," Sep. 1997, 20 pages, Network Working Group, Request for Comments: 2212.

J. Moy, "OSPF Version 2," Apr. 1998, 244 pages, Network Working Group, Request for Comments: 2328, The Internet Society.

G. Malkin, "RIP Version 2," Nov. 1998, 39 pages, Network Working Group, Request for Comments: 2453, The Internet Society.

S. Deering, et al., "Internet Protocol, Version 6 (IPv6) Specification," Dec. 1998, 39 pages, Network Working Group, Request for Comments: 2460, The Internet Society.

K. Nichols, et al., "Definition of the Differentiated Services Field (DS Field) in the IPv4 and IPv6 Headers," Dec. 1998, 20 pages, Network Working Group, Request for Comments: 2474, The Internet Society.

S. Blake, et al., "An Architecture for Differentiated Services," Dec. 1998, 36 pages, Network Working Group, Request for Comments: 2475, The Internet Society.

J. Heinanen, et al., "Assured Forwarding PHB Group," Jun. 1999, 11 pages, Network Working Group, Request for Comments: 2597, The Internet Society.

D. Borman, et al., "IPv6 Jumbograms," Aug. 1999, 9 pages, Network Working Group, Request for Comments: 2675, The Internet Society.

D. Black, "Differentiated Services and Tunnels," Oct. 2000, 14 pages, Network Working Group, Request for Comments: 2983, The Internet Society.

D. Thaler, et al., "Multipath Issues in Unicast and Multicast Next-Hop Selection," Nov. 2000, 9 pages, Network Working Group, Request for Comments: 2991, The Internet Society.

C. Hopps, "Analysis of an Equal-Cost Multi-Path Algorithm," Nov. 2000, 8 pages, Network Working Group, Request for Comments: 2992, The Internet Society.

K. Nichols, et al., "Definition of Differentiated Services Per Domain Behaviors and Rules for their Specification," Apr. 2001, 24 pages, Network Working Group, Request for Comments: 3086, The Internet Society.

D. Black, et al., "Per Hop Behavior Identification Codes," Jun. 2001, 8 pages, Network Working Group, Request for Comments: 3140, The Internet Society.

D. Awduche, et al., "RSVP-TE: Extensions to RSVP for LSP Tunnels," Dec. 2001, 61 pages, Network Working Group, Request for Comments: 3209, The Internet Society.

B. Davie, et al., "An Expedited Forwarding PHB (Per-Hop Behavior)," Mar. 2002, 16 pages, Network Working Group, Request for Comments: 3246, The Internet Society.

A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.

D. Grossman, "New Terminology and Clarifications for Diffserv," Apr. 2002, 10 pages, Network Working Group, Request for Comments: 3260, The Internet Society.

F. Baker, et al., "Management Information Base for the Differentiated Services Architecture," May 2002, 116 pages, Network Working Group, Request for Comments: 3289, The Internet Society.

Y. Bernet, et al., "An Informal Management Model for Diffsery Routers," May 2002, 56 pages, Network Working Group, Request for Comments: 3290, The Internet Society.

K. Chan, et al. "Differentiated Services Quality of Service Policy Information Base," Mar. 2003, 96 pages, Network Working Group, Request for Comments: 3317, The Internet Society.

L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.

K. Kompella, et al., "Procedures for Modifying the Resource reSerVation Protocol (RSVP)," Oct. 2004, 7 pages, Network Working Group, Request for Comments: 3936, The Internet Society.

B. Fenner, et al., "Management Information Base for the User Datagram Protocol (UDP)," Jun. 2005, 19 pages, Network Working Group, Request for Comments: 4113, The Internet Society.

Y. Rekhter, et al., "A Border Gateway Protocol 4 (BGP-4)," Jan. 2006, 104 pages, Network Working Group, Request for Comments: 4271, The Internet Society.

S. Kent, et al., "Security Architecture for the Internet Protocol," Dec. 2005, 101 pages, Network Working Group, Request for Comments: 4301, The Internet Society.

R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

E. Rosen, et al., "BGP/MPLS IP Virtual Private Networks (VPNs)," Feb. 2006, 47 pages, Network Working Group, Request for Comments: 4364, The Internet Society.

J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.

Z. Ali, et al., "Node-ID Based Resource Reservation Protocol (RSVP) Hello: A Clarification Statement," Jun. 2006, 7 pages, Network Working Group, Request for Comments: 4558, The Internet Society.

J. Babiarz, et al., "Configuration Guidelines for DiffServ Service Classes," Aug. 2006, 57 pages, Network Working Group, Request for Comments: 4594, The Internet Society.

(56) References Cited

OTHER PUBLICATIONS

K. Kompella, et al., "Virtual Private LAN Service (VPLS) Using BGP for Auto-Discovery and Signaling," Jan. 2007, 28 pages, Network Working Group, Request for Comments: 4761, The IETF Trust.

M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.

L. Andersson, et al., "LDP Specification," Oct. 2007, 135 pages, Network Working Group, Request for Comments: 5036, The IETF Trust.

R. Coltun, et al., "OSPF for IPv6," Jul. 2008, 94 pages, Network Working Group, Request for Comments: 5340, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

\* cited by examiner

300

```
┌─────────────────────────────────────────────────────────────────────────┐
│ Receive control messages, wherein the control messages are messages     │
│ transmitted from the network controller to the network device           │
│                              302                                        │
└─────────────────────────────────────────────────────────────────────────┘
                                    │
                                    ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Order the control messages according to a time stamp associated with    │
│ each control message                                                    │
│                              304                                        │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                    │
                                    ▼
┌─────────────────────────────────────────────────────────────────────────┐
│ Extract a subset of control messages from the control messages, where   │
│ each control message from the subset caused a change in the forwarding  │
│ state of the network device                                             │
│                              306                                        │
└─────────────────────────────────────────────────────────────────────────┘
                                    │
                                    ▼
┌─────────────────────────────────────────────────────────────────────────┐
│ Generate, based on the extracted subset of control messages, a directed │
│ graph, wherein the directed graph is representative of the forwarding   │
│ state of the network device                                             │
│                              308                                        │
└─────────────────────────────────────────────────────────────────────────┘
                                    │
                                    ▼
┌─────────────────────────────────────────────────────────────────────────┐
│ Cause the display of the directed graph on a display device             │
│                              310                                        │
└─────────────────────────────────────────────────────────────────────────┘
```

Fig. 3

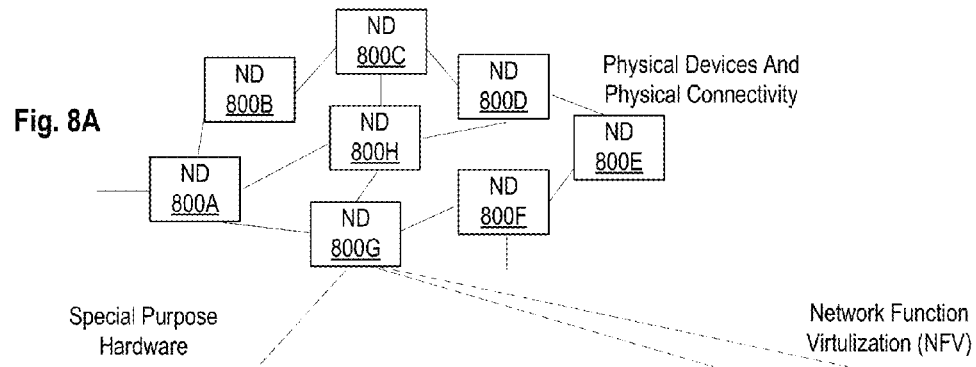
Fig. 8A
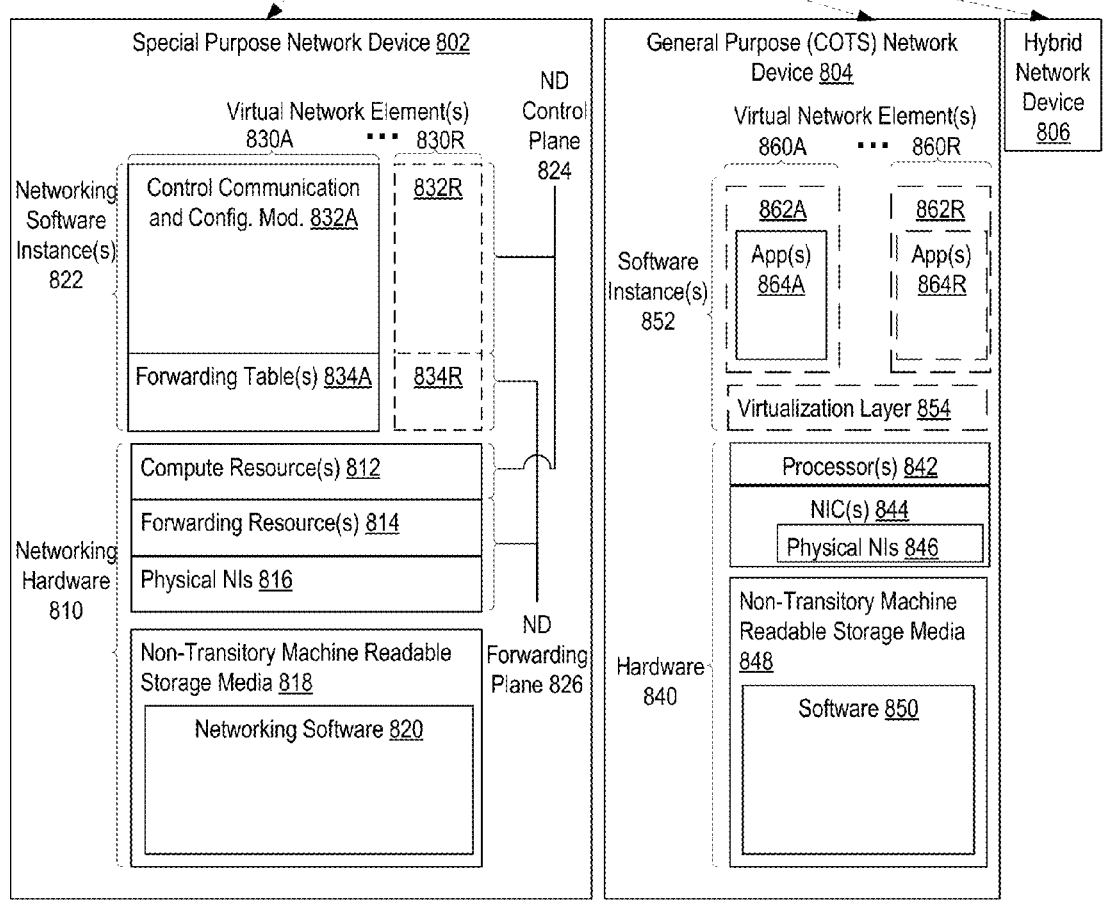
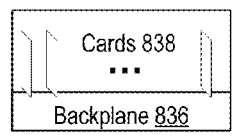
Fig. 8B

METHOD AND AN APPARATUS FOR NETWORK STATE RE-CONSTRUCTION IN SOFTWARE DEFINED NETWORKING

FIELD

Embodiments of the invention relate to the field of networking; and more specifically, to the re-construction of forwarding states of a network device in a Software Defined Network (SDN).

BACKGROUND

Today's networking systems are very complex and are inherently distributed. Troubleshooting issues in networking systems is a very involved task. During recent years software defined networking (SDN) has been gaining momentum. SDN does not eliminate the complexity inherent in networking systems but it moves most of the complexity to one logically centralized system—the network controller.

Debugging networking systems like an SDN network controller is very complex as the network controller consists of a cluster of nodes controlling multiple network nodes. The debugging of the SDN controller (or the controller cluster) includes understanding the current forwarding state of the network and how this state is changed by the controller cluster during an interval of time. The currently used approach to debug issues and to determine or re-construct a forwarding state of the network is predominantly using text logs and network packet traces.

SUMMARY

The present disclosure generally relates to debugging and troubleshooting of SDN systems, and more specifically to re-construction and tracking of forwarding states of network devices in an SDN. The techniques presented herein enable a user to visualize a current forwarding state of a network device, and/or changes occurring in the forwarding state of the device during an interval of time.

In some embodiments, a method of re-construction of a forwarding state of a network device in communication with a network controller in a Software Defined Network (SDN), is disclosed. The method comprises receiving control messages, wherein the control messages are messages transmitted from the network controller to the network device. The method continues with extracting a subset of control messages from the control messages, wherein each control message from the subset of control messages caused a change in the forwarding state of the network device. The method further includes generating, based on the extracted subset of control messages, a directed graph, wherein the directed graph is representative of the forwarding state of the network device; and causing the directed graph to be displayed on a display device.

According to some embodiments, a non-transitory computer readable medium, having stored thereon a computer program, which when executed by a processor performs operations for re-constructing a forwarding state of a network device in communication with a network controller in a Software Defined Network (SDN), is disclosed. The operations include receiving control messages, wherein the control messages are messages transmitted from a network controller to a network device of a Software Defined Network (SDN). The operations continue with extracting a subset of control messages from the control messages, wherein each control message from the subset of control messages caused a change in a forwarding state of the network device. The operations further include generating, based on the extracted subset of control messages, a directed graph, wherein the directed graph is representative of the forwarding state of the network device; and causing the directed graph to be displayed on a display device.

BRIEF DESCRIPTION OF THE DRAWINGS

The invention may best be understood by referring to the following description and accompanying drawings that are used to illustrate embodiments of the invention. In the drawings:

FIG. 3 illustrates a flow diagram of operations for reconstructing a forwarding state of a network device in accordance with some embodiments of the invention.

FIG. 8A illustrates connectivity between network devices (NDs) within an exemplary network, as well as three exemplary implementations of the NDs, according to some embodiments of the invention.

FIG. 8B illustrates an exemplary way to implement a special-purpose network device according to some embodiments of the invention.

DESCRIPTION OF EMBODIMENTS

Figure 1:
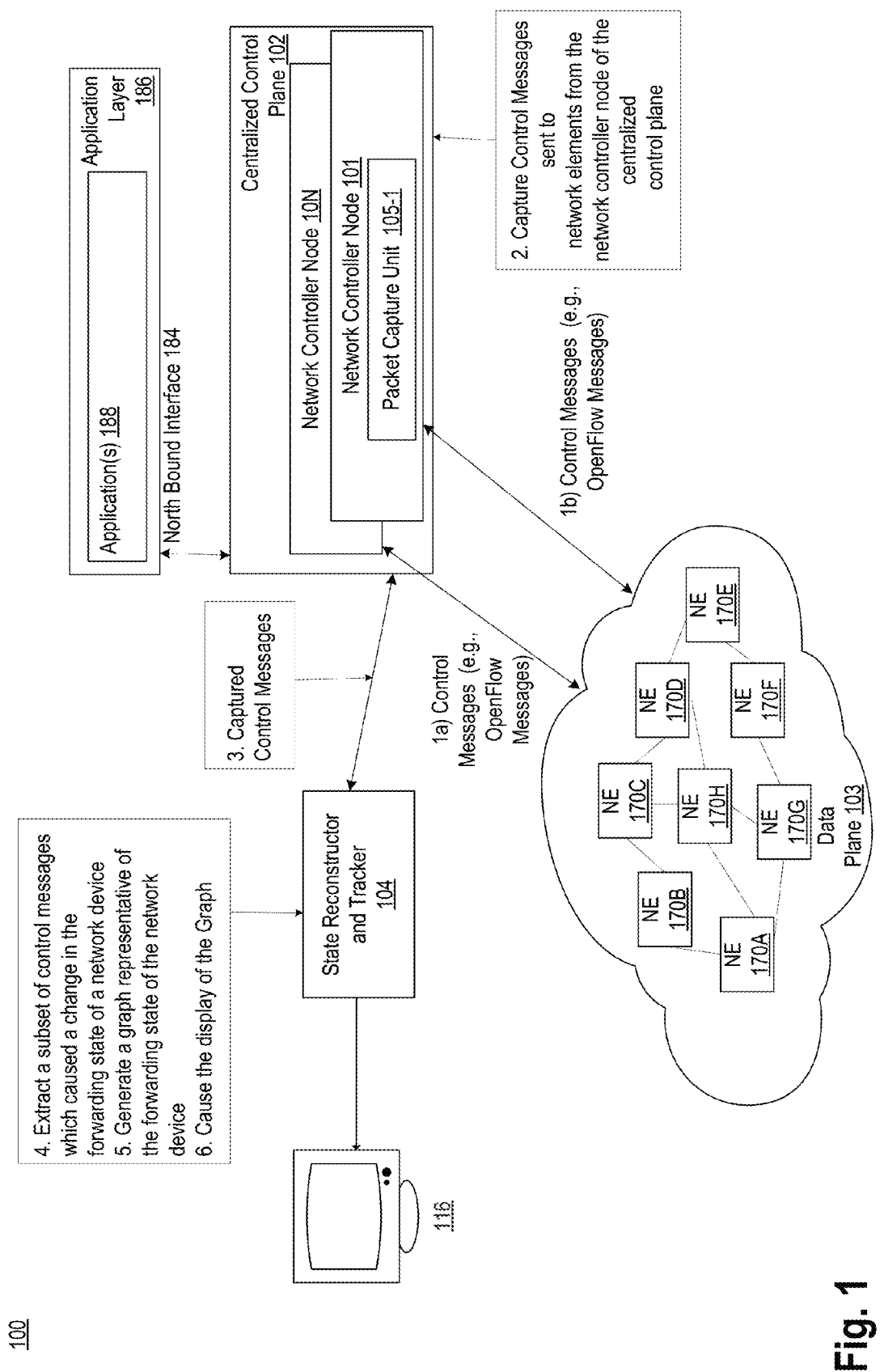
FIG. 1 illustrates a block diagram of a system and a method of re-construction of a forwarding state of a network device in communication with a network controller in a software defined network (SDN) according to some embodiments of the invention.

The following description describes methods and apparatus for re-construction of a forwarding state of a network device in communication with a network controller in a Software Defined Network (SDN). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Software Defined Networking is a nascent technology which allows decoupling of the system that makes decisions about where traffic is sent from the underlying systems that forwards traffic to the selected destination. In SDN, the responsibility for the generation of reachability and forwarding information is included in a centralized control plane (sometimes referred to as a SDN control module, controller, network controller, OpenFlow controller, SDN controller, control plane node, network virtualization authority, controller cluster, or management control entity), and thus the process of neighbor discovery and topology discovery is centralized. The centralized control plane is very complex, often implemented as a distributed system on one or more controller nodes which manage and control a plurality of network devices within the SDN network. Thus debugging and troubleshooting an SDN system is challenging given the scale and the number of elements interacting in the system (e.g., the nodes of the controller cluster, the network devices of the data plane, the various operations occurring during a period of time).

Further an error in any one of the modules in the controller cluster or in one of the northbound applications can trigger an inconsistent change in the forwarding state of one of the networking devices of the SDN system, which results in traffic drop in the SDN network. Debugging the errors which cause the inconsistent change and/or the traffic drop in the network is often performed by an analysis of the exchange of messages between network devices (e.g., OpenFlow switches) in the forwarding plane (i.e., data plane) and the multiple network controller nodes of the controller cluster.

In one approach, the debugging of an SDN network controller, which includes in part the analysis of errors related to forwarding state changes, involves a tedious analysis of packet traces. In this approach, an analysis system is used to access multiple large packet trace files to be analyzed in a text format. The analysis is then performed through a user's manual correlation of messages in the packet trace files. The packet trace files were received from the multiple network controller nodes at different times and the user manually analyzes these files in order to identify and troubleshoot the errors that occurred in the control plane following a change in the state of the network. However, the manual correlation and analysis of packet trace files is not scalable and prone to errors.

Thus there is a need for a method and an apparatus to provide better support/troubleshooting of SDN solutions deployed in the field and to provide quicker problem resolution in laboratories.

As noted, debugging a network system using textual packet trace files from multiple network elements can be time consuming and highly inefficient. To improve the method of debugging SDN network systems, embodiments of the invention provide for methods, systems, and apparatuses for tracking and reconstructing forwarding state changes of an SDN network. The state of each network element, implemented on a network device in the SDN networking systems, can be modeled as a graph consisting of nodes and edges. In the embodiments of the present invention, a node of the graph may represent a forwarding table (e.g., flow table or group table), an output interface, or the SDN controller. An edge may represent an action occurring between two nodes of the graph (e.g., a modification to a forwarding table A with an instruction to go to another forwarding table B). This model/graph represents the state of the network element at any point in time and/or the changes occurring in the forwarding state of the network element during an interval of time. Instead of textual packet trace files, embodiments of the invention enable a user to get a visual representation of the state of a network element at a given moment in time and/or a visual representation of the changes in the state of the network element during a period of time with a graph illustrating the state of the processing pipeline within the network element based on an automatic analysis of control commands sent from the controller cluster to the network element. Queries can then be made to such a temporal graph to debug issues more effectively and more formally, and the graph can be manipulated to gain crucial insights about the network. For example extracting how the system state changes during a time interval before a failure happens can be a simple high level query which can be seen visually by the debugger (user).

Thus, the embodiments of the invention provide mechanisms for quickly and automatically identifying forwarding state changes that cause errors in the processing pipeline (or alternatively which is referred to as a forwarding pipeline such as the OpenFlow pipeline) within each network element (such as an OpenFlow switch) which cause traffic drop in the forwarding plane.

FIG. 1 illustrates a block diagram of a system 100 and a method of re-construction of a forwarding state of a network device in communication with a network controller in a software defined network (SDN). The system 100 includes network elements (NE) 170A-170H, coupled with the centralized control plane 102. The centralized control plane includes one or more network controller node 101, and 10N. While only two network controller nodes are illustrated, the centralized control plane 102 may include additional network controller nodes forming the controller cluster. Each of the NE 170A-H may be implemented on a network device as described in further details with respect to FIGS. 8A-8F. The centralized control plane 102 (or as referred herein below as the network controller) may be implemented as described in further detail with respect to FIGS. 8D and 9. The network controller is further coupled through a north bound interface with an application layer 186 including one or more applications 188. The system 100 includes a state re-constructor and tracker (SRT) 104 coupled with the centralized control plane 102 and with a display device 116.

According to some embodiments, the system provides a method and apparatus for reconstructing and tracking the forwarding state of each of the network devices 170A-170H at a given moment in time and display a graph representation of this state at that moment or a change of the forwarding state during an interval of time. The forwarding state of a network device at a given moment in time is a current forwarding state and includes a snapshot of the content of the forwarding table(s) of the network device at that moment. Alternatively the forwarding state of the network device represents a change that occurred in the forwarding table(s) of the network device between two moments in time.

At task box 1a and 1b, control messages are exchanged between the network controller 102 and NE 170A-H of the data plane 103. The control messages are sent from one of the controller nodes (e.g., 101, and 10N) to at least one of the NE 170A-H. NE 170A-H may transmit replies to the network controller 102. The centralized control plane 102 transmits control messages to the data plane 103 based on CCP application layer 186 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs (as defined below) of the data plane 103 may receive different messages, and thus different forwarding information. The data plane 103 processes these messages and programs the appropriate flow information and corresponding actions in the forwarding tables (sometime referred to as flow tables and group tables) of the appropriate NE/VNEs, and then the NEs/VNEs map incoming packets to flows/groups represented in the forwarding tables and forward packets based on the matches in the forwarding tables.

In some embodiments, the control messages are transmitted according to the OpenFlow protocol as standardized by the Open Networking Foundation (ONF). In some embodiments the control messages may include a subset of messages which cause a change in the forwarding state of a NE. A change in the forwarding state of one of NEs 170A-H is defined by a change of an entry of one of the forwarding tables (e.g., a modification, addition, and or deletion of an entry). In a non-limiting exemplary embodiment, the network controller node 101 may transmit a control message to NE 170D causing an insertion of a new forwarding table entry in a forwarding table of NE 170D. In another embodiment, the network controller node 101 transmits a control message to NE 170D to delete or modify a pre-existing entry in a forwarding table of the NE 170D. The operations of the system will be described with the non-limiting example of NE 170D. Even though the embodiments below will use NE 170D as an example, one would understand that the operations of the system may apply to any of the other NEs 170A-C, and 170E-H and to other NEs not illustrated in the system. The embodiments of the invention allows a user to select, during operation, the NE that they would like to monitor/debug and the state of which should be displayed at a moment of time.

At task box 2, the network controller 102 captures the control messages sent to the NE 170D from the network controller node 101 of the network controller 102. In some embodiments the control messages are captured using packet capture unit 105-1. The packet capture unit 105-1 may be implemented using a packet capture library such as libpcap Library and WinPcap Library for Windows. The packet capture may be implemented to operate in an offline mode in which captured packets are saved to a packet capture file (e.g., pcap files). In alternative embodiments, the packet capture may be implemented to operate in a live mode in which case the packets are captured off the wire instead of from packet capture files.

At task box 3, the captured packets (e.g., pcap files) are sent to the state re-constructor and tracker 104. At task box 4, SRT 104 extracts a subset of control messages from the captured control messages received from the network controller 102. Each message from the subset of control messages caused a change in a forwarding state of the NE 170D. At task box 5, SRT 104 generates a graph representative of the forwarding state of the NE 170D based on the extracted subset of control messages and at task box 6, the SRT 104 causes the display of the graph on the display device 116. The operations performed in the SRT 104 will be described in further detail with reference to FIGS. 2-7.

Figure 2:
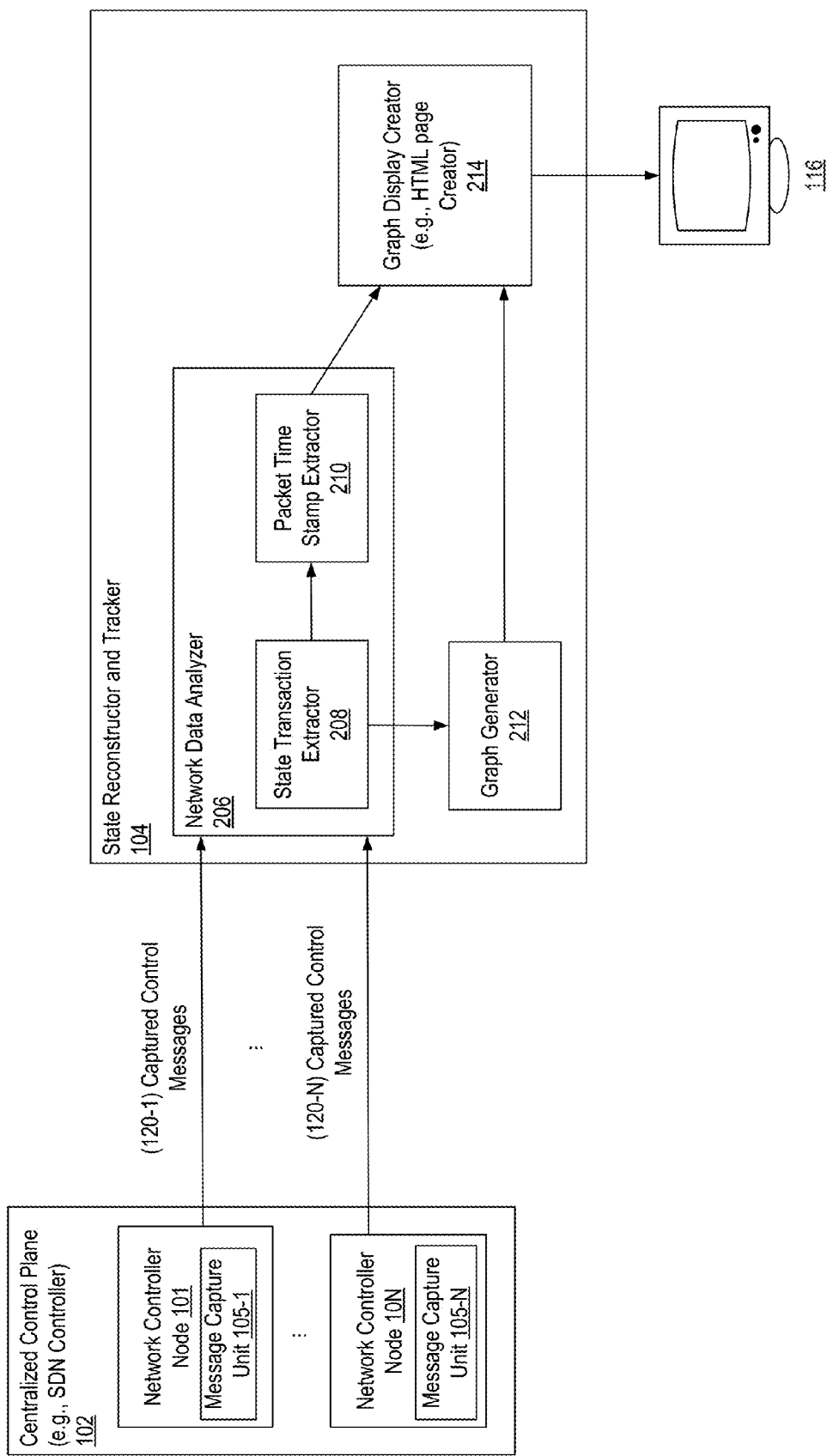
FIG. 2 illustrates a block diagram of a state re-constructor and tracker 104 according to some embodiments of the invention.

FIG. 2 illustrates a block diagram of a state re-constructor and tracker 104 according to some embodiments. The SRT 104 is coupled with a control plane 102 to receive captured control messages (e.g., 120-1, 120-N) from the network controller nodes of the control plane 102 (e.g., from node 101, and node 10N). Each of the control nodes includes a packet capture unit (e.g., 105-1, 105-N) operative to capture messages transmitted from the network control nodes to one or more NE of the data plane. In some embodiments, the control messages are OpenFlow message transactions and all the OpenFlow message transactions between nodes in the controller cluster and OpenFlow switches are either collected in a live mode or in an offline mode. The captured control messages are sent to the SRT 104.

In FIG. 2, SRT 104 is operative to perform operations for re-constructing the forwarding state of a network device at any given moment in time or during an interval of time (between a first and a second moment). SRT 104 includes a network data analyzer 206, coupled with a graph generator 212, which is coupled with a graph display creator 214. The SRT 104 is implemented on an electronic device. The network data analyzer 206 receives control messages from the network controller 102. The control messages (e.g., multiple packet traces exchanged between the different controller nodes and a network element (e.g., NE 170D)) are time ordered to obtain one view of the entire controller cluster 102. The ordering is performed based on the timestamp tagged with each captured packet trace (which may also be referred to as a packet frame).

The network data analyzer 206, then extracts from the ordered control messages a subset of control messages (or a subset of captured packet traces/frames), where each message from this subset caused a change in the forwarding state of NE 170D. In some embodiments, the extraction is based on the OpenFlow protocol and all messages including a modification, of a flow table (e.g., including a "OFPT_FLOW_MOD") or a modification of a group table (e.g., including "OFPT_GROUP_MOD") are extracted (or selected) while other messages are ignored. In some embodiments, the ordering of the control messages by the network data analyzer may be optional and/or may be performed following the operation of extracting the subset of control messages. In some embodiments, the ordering and extraction of control messages is performed by the state transaction extractor 208. The extracted control messages are then forwarded to the packet time stamp extractor 210 and to the graph generator 212.

The graph generator 212 is operative to generate, based on the extracted subset of control messages, a directed graph, wherein the directed graph is representative of the forwarding state of the network element 170D. The generation of the graph will described in further detail below with respect to FIG. 5.

The packet time stamp extractor 210 is operative to extract from each extracted message (packet trace) a time stamp. In some embodiments, the time stamp corresponds to the time at which the message was sent from one of the network controller nodes to the NE 170D. In some embodiments, the time stamps are used to generate an event time line which will be described in further details with reference to FIG. 7.

The embodiments of the invention discussed with reference to the flow diagrams of FIGS. 3, 4, and 5 will be described with reference to the block diagrams of FIGS. 1, and 2. However, it should be understood that the operations of the flow diagrams can be performed by embodiments of the invention other than those discussed with reference to FIGS. 1, and 2, and the embodiments of the invention discussed with reference to FIGS. 1, and 2 can perform operations different than those discussed with reference to the flow diagrams.

FIG. 3 illustrates a flow diagram of operations for reconstructing a forwarding state of a network device in accordance with some embodiments. At block 302, the network data analyzer 208 of SRT 104 receives control messages. The control messages (e.g., multiple packet traces exchanged between the different controller nodes and a network element (e.g., NE 170D)) are time ordered, at block 304, to obtain one view of the entire controller cluster 102. The ordering is performed based on the timestamp tagged with each captured packet trace (which may also be referred to as a packet frame).

Flow then moves to block 306, at which a subset of control messages (or a subset of captured packet traces/frames) is extracted from the received control messages. Each message from this subset is selected based on the determination that it caused a change in the forwarding state of NE 170D. In some embodiments, the extraction performed at block 306 is performed according to the operations described in FIG. 4.

Figure 4:
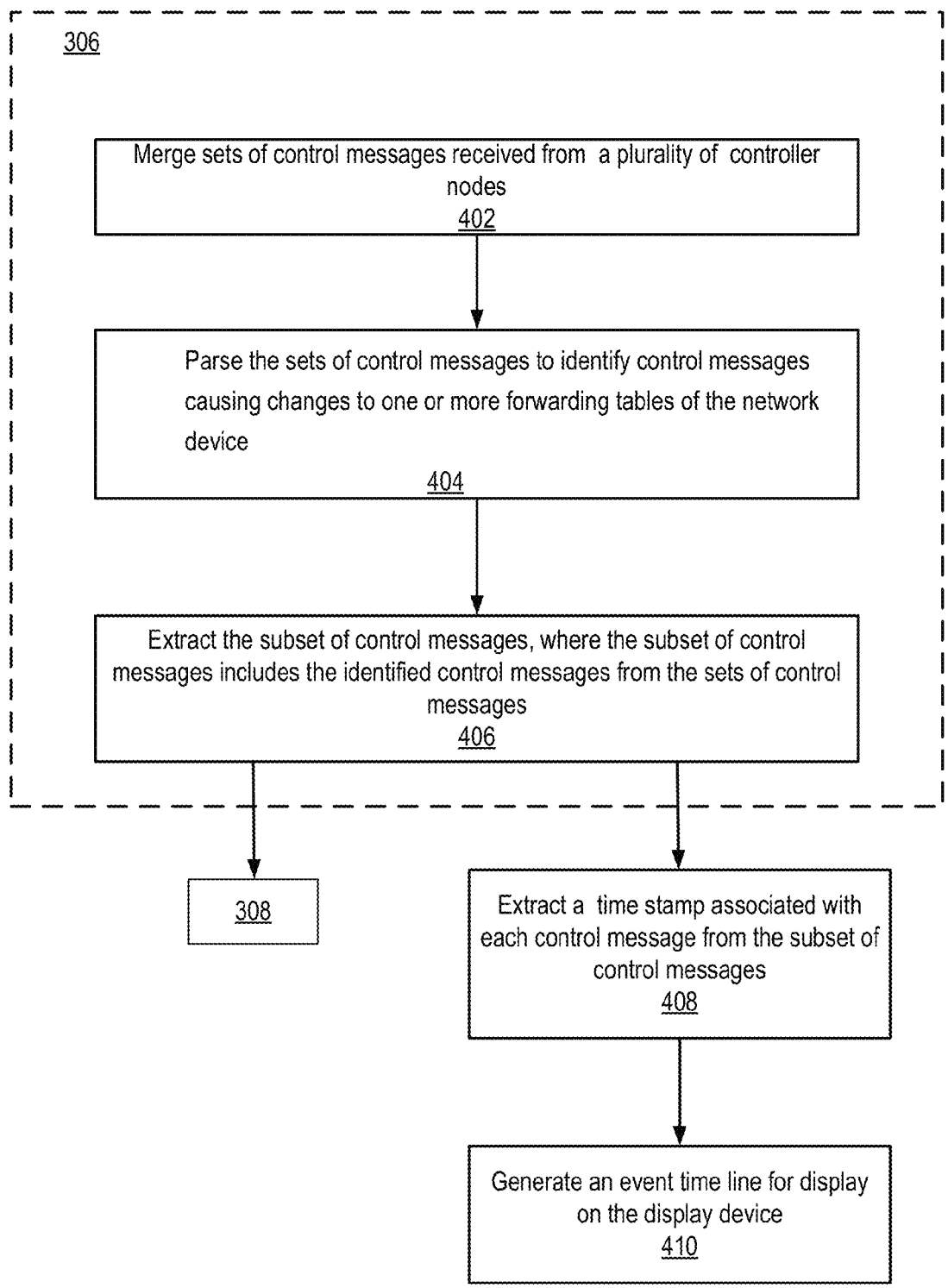
FIG. 4 illustrates a flow diagram of operations performed for extracting a subset of control messages in accordance with some embodiments of the invention.

FIG. 4 illustrates a flow diagram of operations performed for extracting a subset of control messages in accordance with some embodiments. In some embodiments, the network controller includes a plurality of network controller nodes (e.g., node 101 and node 10N of network controller 102), and the SRT 104 receives a set of control messages from each one of these network controller nodes. Thus upon receipt of the various sets of control messages, SRT 104 (and in particular the state transaction extractor 208) merges, at block 402, the sets of control messages received from the multiple network controller nodes. At block 404, the state transaction extractor 208, parses the sets of control messages to identify control messages that caused changes to one or more forwarding tables of the network device (NE 70D). In some embodiments, the control messages (or packet frames/traces) are subjected to OpenFlow protocol parsing to extract all the OpenFlow messages which result in forwarding state changes. In particular, the parsing of the messages identifies messages including "OFPT_FLOW_MOD" (with Add/Modify/Delete/Delete Strict) and "OFPT_GROUP_MOD" (with Add/Modify/Delete). Flow then moves to block 406, at which the subset of control messages is extracted. The flow then moves to block 308, and/or block 408. In some embodiments, the flow may alternatively move to only one of the two blocks (308, and 408) and only one of a graph and event time line may be generated based on the extraction of the control messages which caused a change in the network device. In other embodiments, both operations are performed and a graph and an event time line are both generated from the extracted control message to provide a visual representation of the state of the network device.

Referring back to FIG. 3, in some embodiments, the ordering of the control messages by the network data analyzer may be optional and/or may be performed following the operation of extracting the subset of control messages. In some embodiments, the ordering and extraction of control messages is performed by the state transaction extractor 208. The extracted control messages are then forwarded to the packet time stamp extractor 210 and to the graph generator 212 (i.e., flow moves to block 408 or 308 respectively).

The graph generator 212 is operative to generate, at block 308, based on the extracted subset of control messages, a directed graph, wherein the directed graph is representative of the forwarding state of the network element 170D.

Figure 5:
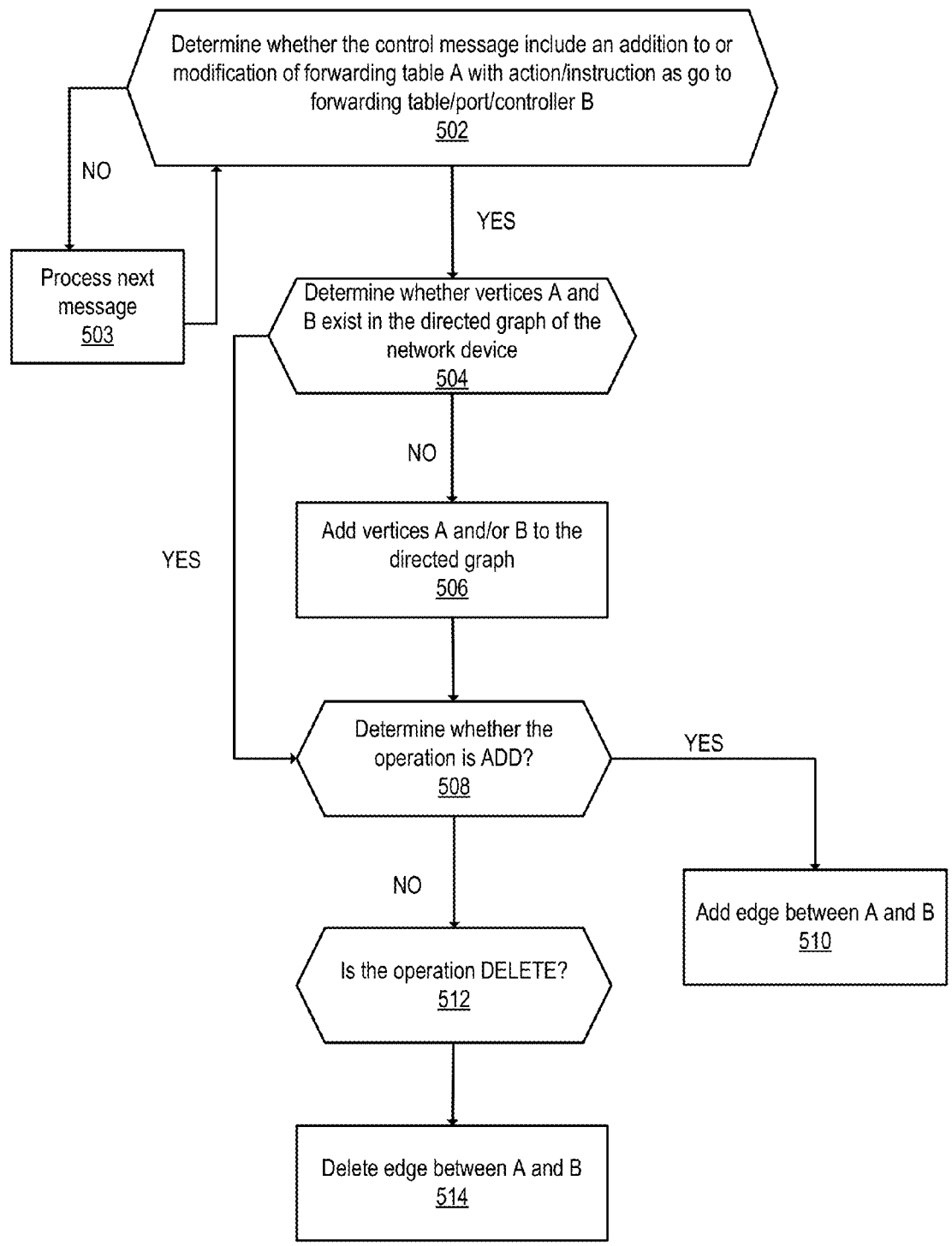
FIG. 5 illustrates a flow diagram of operations for generating a directed graph representative of a forwarding state of a network device in accordance with some embodiments of the invention.

FIG. 5 illustrates a flow diagram of operations for generating a directed graph representative of a forwarding state of a network device in accordance with some embodiments. Upon extraction of the control messages which caused a change in the network device's state, the SRT 104, and in particular the graph generator 212, determines for each extracted control message whether it includes an addition to or a modification of a forwarding table A (i.e., a flow table A or a group table A) with an action/instructions (such as "Go To") to another forwarding table (i.e., flow table or group table)/port/controller B. Upon determination that such addition/modification exists, the graph generator 212, determines whether the vertices A and B already exist in the graph representing the state of the network device (e.g., 170D). If either one of the vertices A and B does not exist in the graph, flow moves to operation 506, at which the missing vertex is added to the graph. In some embodiments, neither vertices exist in the graph and both are added. In alternative embodiments, only one of the vertices is not already present, and this missing vertex is added to the graph. The flow then moves to block 508, at which the graph generator 212 determines whether the operation included in the control message is "ADD" (i.e., for adding a forwarding table entry to the forwarding table (e.g., adding a group entry in a group table or adding a flow entry in a flow table)). When it is determined that the operation is an ADD, the graph generator 212 adds an edge between the vertices A and B.

Figure 6:
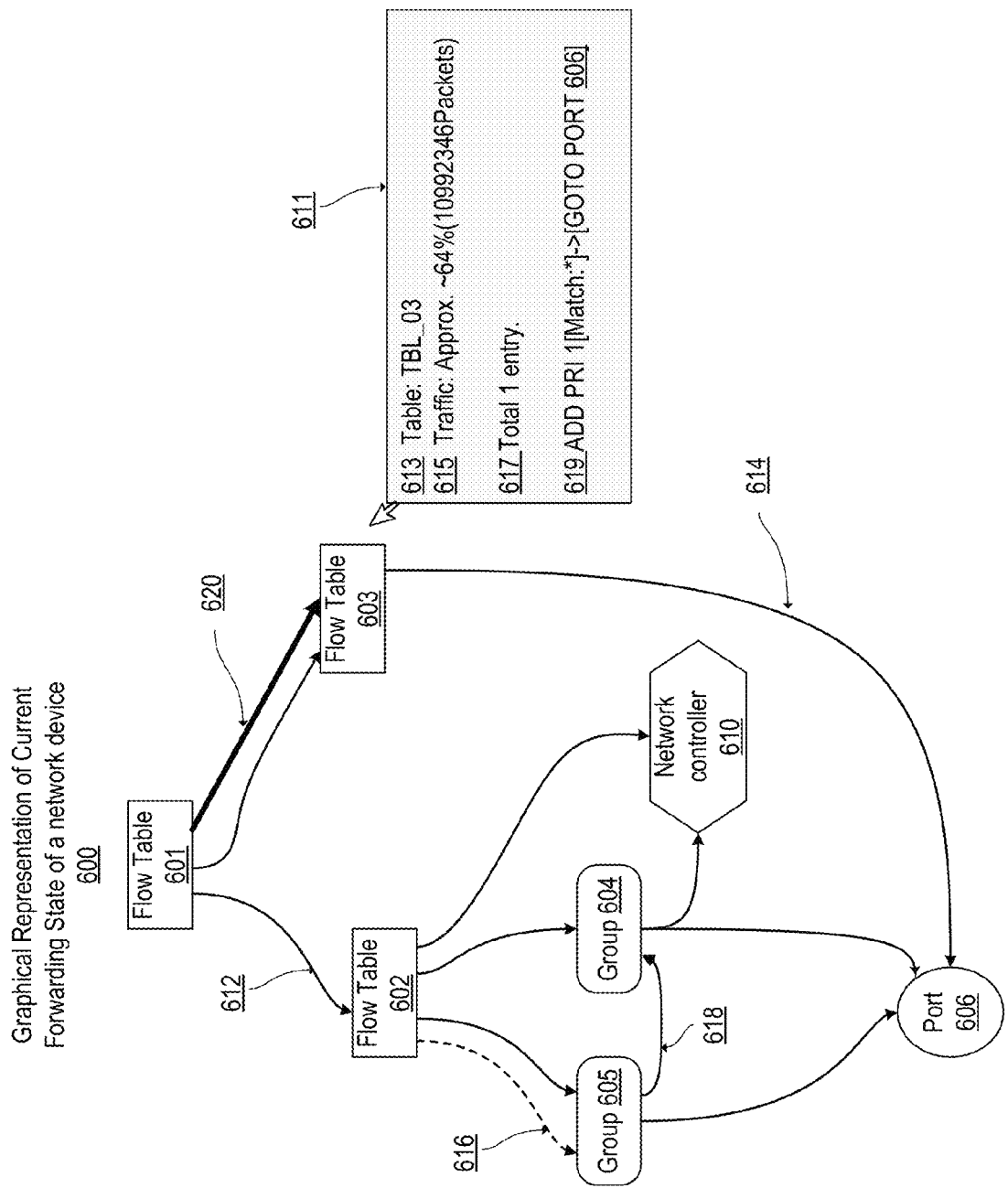
FIG. 6 illustrates an exemplary directed graph 600 representative of a forwarding state of a network device in accordance with some embodiments of the invention.

FIG. 6 illustrates an exemplary directed graph 600 representative of a forwarding state of a network device in accordance with some embodiments. Exemplary operations of adding/removing nodes and edges from the graph (i.e., describing the generation of the graph) will be described below with reference to FIG. 6. In a non-limiting exemplary embodiments, when a flow (i.e., a "OFPT_FLOW_MOD" message is extracted and includes an "ADD") is added to a table A (e.g., flow table 601) to the flow table/group B (e.g., flow table 602) with "GOTO/APPLY ACTION/WRITE ACTION" then the vertices A and B are added (if they do not already exist in the graph 600) and an edge is added to the graph between the vertex A and the vertex B (edge 612). In another example, when a flow (i.e., a "OFPT_FLOW_ MOD" message is extracted and includes an "ADD") is added to a table C (e.g., flow table 603) with an out port instruction to port P (e.g., Port 606) then the vertices C (Table 603) and P (port 606) are added to the graph (if they do not already exist in the graph 600) and when the operation is determined to be an add, an edge is added between the vertices C and P (edge 614). In a third example, when a group G1 (e.g., Group 605) is added (i.e., a "OFPT_ GROUP_MOD" message is extracted and includes an "ADD") with a bucket having a group action to a next bucket G2 (e.g., Group 604) then, the vertices G1 and G2 (group 605, and group 604) are added to the graph (if the nodes G1 and G2 did not exist in the graph). When the operation is "ADD" then and an edge (618) is added the graph 600 between vertices G1 and G2 (group 605, and group 604).

Referring back to FIG. 5, at block 508 when the operation is determined not to be and "ADD," flow then moves to block 512, at which the graph generator determines whether the operations is a "DELETE" operation. When the operation is determined to be "delete," the existing edge between the node A and B is deleted. The deletion would apply whether the edge connects two flow tables (e.g., 601, and 603), two group tables (e.g., 605, and 604), a flow table and a port (e.g., 603, and 606), a group table and a port (e.g., 604, and 606), and a flow table (602) or group table (604) and the network controller 610. In some embodiments, the deletion of an edge may be illustrated with an arrow representing the deleted edge by distinguishing this arrow from the edges representing the addition of an edge to the graph. For example a deleted edge may be represented with an edge having a different pattern (e.g., represented with dotted lines as illustrated with edge 616 in FIG. 6) or a different color to contrast with the color of the added edges. In addition to illustrating deleted and added edges (which correspond to deleted and added forwarding entries in the forwarding tables of the network device), the directed may also include additional information such as block 611 and line 620. Line 620 represents traffic flowing through the network element at the moment that the graph is generated or during the interval of time that the user selected for the graph to be generated. Block 611, is a graphical element displayed when a user selects the flow table 603, which illustrates details about the modification that occurred at the flow table 603 during the period of time for which the graph is generated. The element 611 includes element 613 which illustrates the identification of the table (e.g., TBL_03, which identifies the flow table 603), a state of traffic going through the table (615), the number of entries added to the table (617) and the action performed in that entry (619). In some embodiments, the block 611 may include additional or less information, and is dynamically generated for each vertex of the graph to provide a quick way for the user to visualize details related to the modifications and changes occurring in the processing pipeline of the network device. In some embodiments, the graphical element 611 is displayed upon receipt of an input from the user through an input device (e.g., the user moving a mouse on the box representing the flow table 603). Although the element 611 is shown as being displayed on the right side of the flow table element 603, the element 611 may be displayed at any other convenient location of the display of the user (e.g., the element may be displayed at the bottom of the page, or at the top of the page, or alternatively on the left).

Referring back to FIG. 3, following the generation of the directed graph at block 308, flow moves to block 310 at which the SRT 104 causes the display of the directed graph on a display device. In some embodiments, the graph display creator 214 generates image file (e.g., a Scalable Vector Graphics SVG file) using a graph rendering tool which can be embedded in a Hyper Text Markup Language (HTML) page. The HTML page is then transmitted for display on the display device 116.

In some embodiments, in parallel to generating the graph representative (e.g., graph 600) of the forwarding state of the network device (e.g., NE 170D) at a given moment in time, a time stamp associated with each control message is extracted (block 408) and an event time line for display is generated at block 410.

Figure 7:
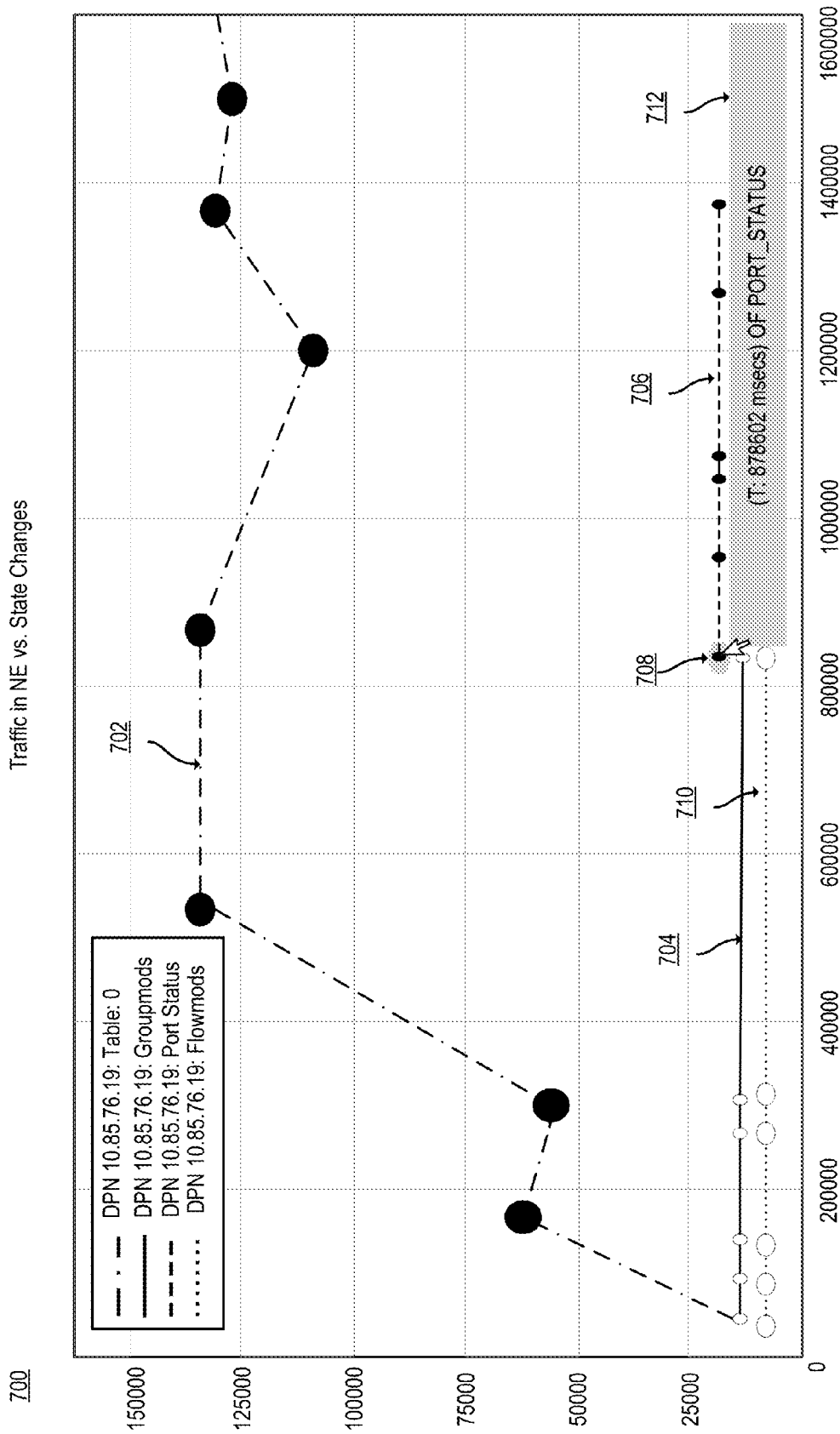
FIG. 7 illustrates a block diagram of an event time line generated by the SRT 104 in accordance with some embodiments of the invention.

FIG. 7 illustrates a block diagram of an event time line generated by the SRT 104 in accordance with some embodiments. The event time line 700 represents the traffic occurring in the NE (e.g., NE 170D) during a period of time (ranging from 0 to 1600000 ms), versus the state changes occurring in the NE during that period. The dotted line 702, represents the traffic going through the table 0 in an OpenFlow switch (NE 170D). In some embodiments line 702 represents the entire traffic going through the switch and its fluctuations during the interval of time. Line 704 represents the changes occurring in the groups of the switch. The line 710 represents the changes occurring in the flow tables of the switch and the line 706 represents the modifications occurring in the ports of the switch. With the use of this graphical representation of the traffic and state of the switch, the user may immediately determine drops in traffic and issues occurring in the switch and their causes. For example in the illustrated embodiment, a drop in traffic is noticed between the time period 800000 ms and 1200000 ms. The user may then, by selecting the point 708, obtain additional information (712) related to the state of the ports of the switch at a moment (e.g., T=878602 ms) immediately prior to the occurrence of the traffic drop. This assists the user is determining the cause of traffic drop.

In some embodiments, the graphical representations illustrated in FIG. 7 and FIG. 6 representing the state of the NE may be displayed concurrently on the same page allowing the user to efficiently correlate problems occurring in the NE with the general forwarding state of the NE. In some embodiments, the graphs may be displayed on a web page which can allow the user to interact with the SRT 104 for selecting for example the NE to monitor as well as the period of time at which the state of the network should be monitored. For example, the user may be presented with a drop down menu including a list of all NEs monitored by the SRT 104, enabling the user to pick one of the NEs for which they would like to visualize the state. In addition the user may enter a period of time including a start position and an end position for which they would like to visualize the changes that occurred in the selected NE during that interval. The user may interact with the SRT 104 through a graphical user interface and Input/output devices coupled with the SRT 104 as will be described further below with reference to FIG. 10.

Using this web page a user can easily achieve multiple actions with a few clicks and inputs. The user may obtain a time ordered visual view of the forwarding state changes (e.g., FIG. 7). The user may visualize a state of the forwarding pipeline (OpenFlow pipeline) of any given NE (e.g., switch) at any given time (e.g., as illustrated in the example of FIG. 6). This includes visualizing the contents of OpenFlow tables or group buckets at any given time of any given NE in the network. The user may visualize a state of the forwarding pipeline (OpenFlow pipeline) of any given NE (e.g., switch) changes during a time window (FIG. 6). The user may quickly trace back to the message transactions the cause of forwarding pipeline breaks, which caused traffic drops.

The embodiments of the present invention overcome the limitations of prior approaches enabling a user to automatically keep track of large OpenFlow forwarding state changes effected by the controller cluster on network devices. All messages from the controller cluster which change the forwarding state of a network device (e.g., OpenFlow switch) are modelled as a directed graph. Such state change graphs can be generated for any given time to quickly view the forwarding state and quickly identify erroneous transactions.

The embodiments of the present invention present an automated analysis of packet traces with an in-built OpenFlow protocol analyzer (SRT 104) to construct a directed graph of state changes showing relations between forwarding table entries as a function of time for quicker analysis of the problems. The embodiments of the invention further provide a graphical analysis of the network state change which is more intuitive and much quicker compared to textual, laborious and manual techniques of debugging a centralized network system.

The state re-constructor and tracker 104 is implemented on an electronic device. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 800A, E, and F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a proprietary operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

The special-purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization—represented by a virtualization layer 854 and software containers 862A-R. For example, one such alternative embodiment implements operating system-level virtualization, in which case the virtualization layer 854 represents the kernel of an operating system (or a shim executing on a base operating system) that allows for the creation of multiple software containers 862A-R that may each be used to execute one of the sets of applications 864A-R. In this embodiment, the multiple software containers 862A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 854 represents a hypervisor (sometimes referred to as a virtual machine monitor (VMM)) or a hypervisor executing on top of a host operating system; and 2) the software containers 862A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 864A-R, as well as the virtualization layer 854 and software containers 862A-R if implemented, are collectively referred to as software instance(s) 852. Each set of applications 864A-R, corresponding software container 862A-R if implemented, and that part of the hardware 840 that executes them (be it hardware dedicated to that execution and/or time slices of hardware temporally shared by software containers 862A-R), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 862A-R differently. For example, while embodiments of the invention are illustrated with each software container 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 862A-R to VNEs also apply to embodiments where such a finer level of granularity is used.

In certain embodiments, the virtualization layer 854 includes a virtual switch that provides similar forwarding services as a physical Ethernet switch. Specifically, this virtual switch forwards traffic between software containers 862A-R and the NIC(s) 844, as well as optionally between the software containers 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 8C:
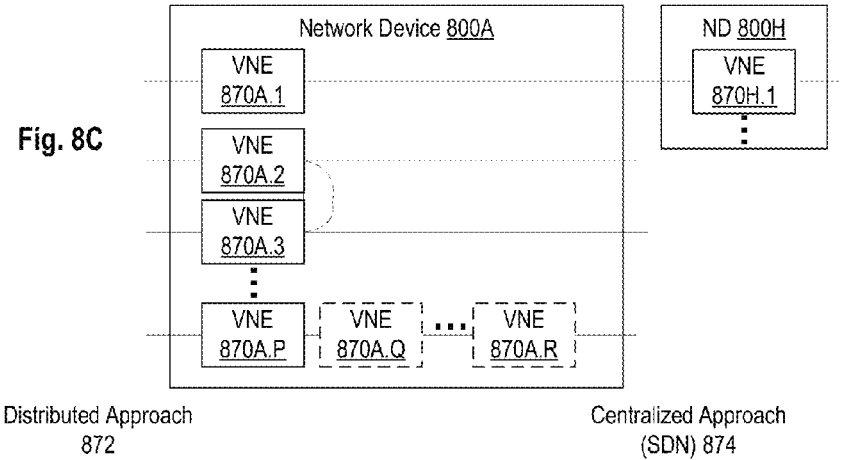
FIG. 8C illustrates various exemplary ways in which virtual network elements (VNEs) may be coupled according to some embodiments of the invention.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service— e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software containers 862A-R may operate as servers; the same would be true for the hybrid network device 806; in the case of the special-purpose network device 802, one or more such servers could also be run on a virtualization layer executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF)

Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 8D:
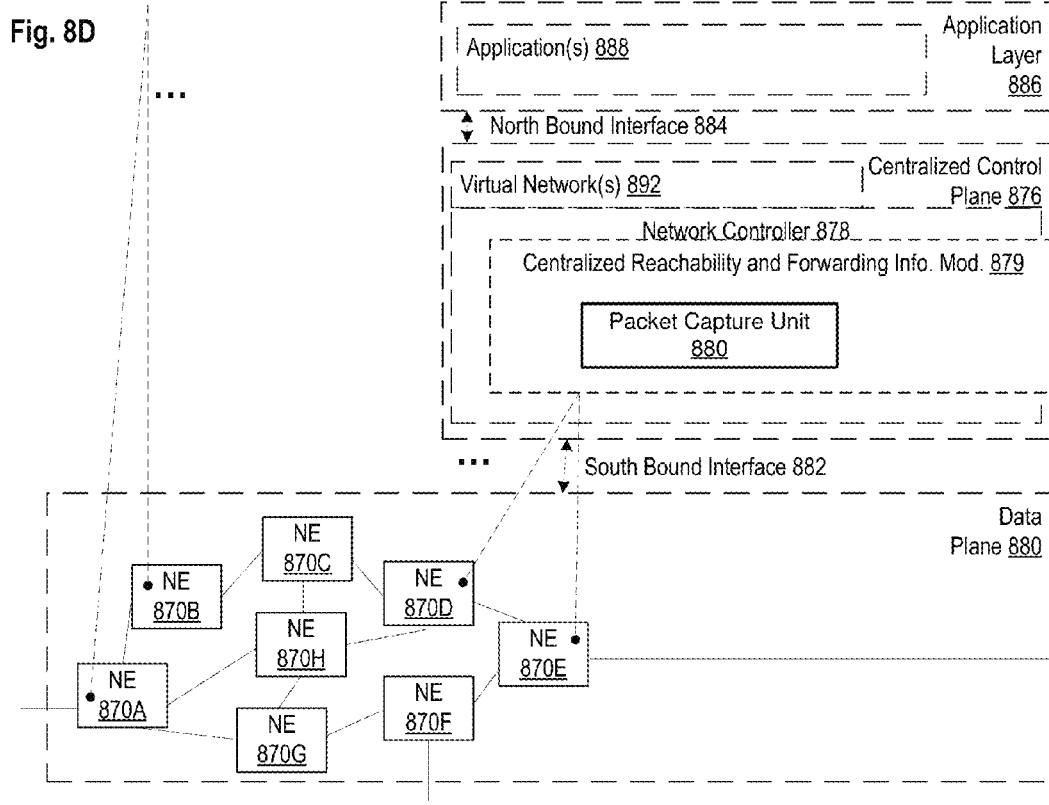
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 870A-H (e.g., the compute resource(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the compute resource(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
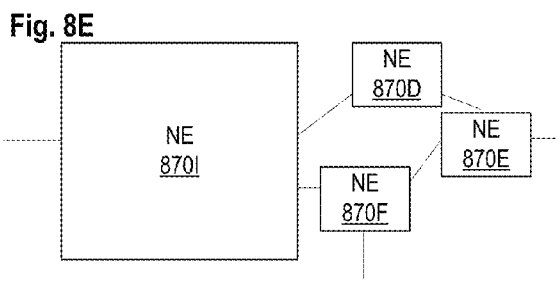
FIG. 8E illustrates the simple case of where each of the NDs implements a single NE, but a centralized control plane has abstracted multiple of the NEs in different NDs into (to represent) a single NE in one of the virtual network(s), according to some embodiments of the invention.
Figure 8F:
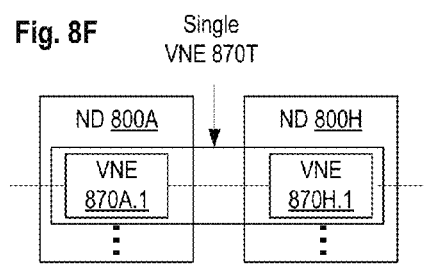
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 870I in one of the virtual network(s) 892 of FIG. 8D, according to some embodiments of the invention. FIG. 8E shows that in this virtual network, the NE 870I is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
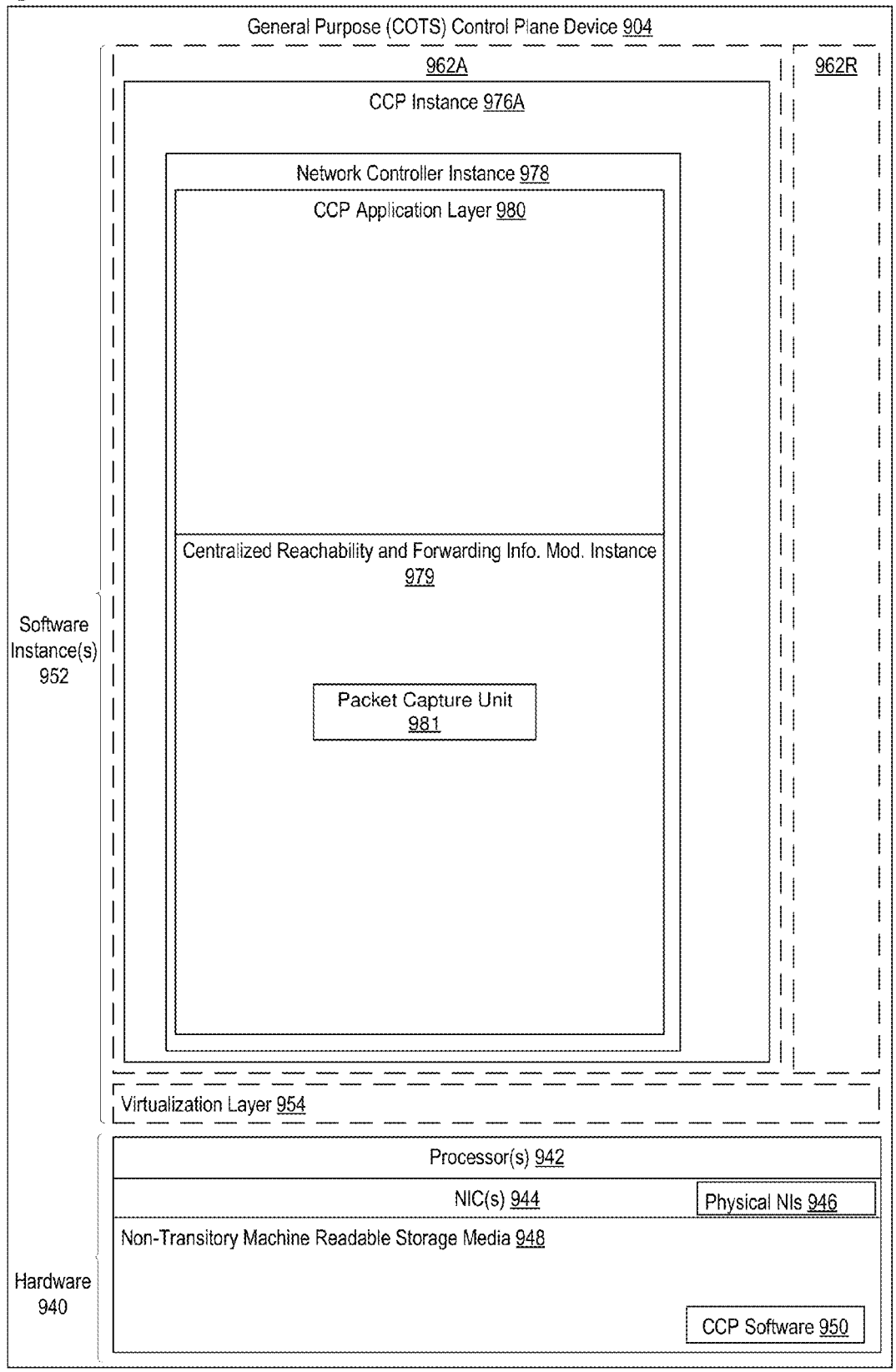
FIG. 9 illustrates a general purpose control plane device with centralized control plane (CCP) software 950), according to some embodiments of the invention.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein centralized control plane (CCP) software 950.

In embodiments that use compute virtualization, the processor(s) 942 typically execute software to instantiate a virtualization layer 954 and software container(s) 962A-R (e.g., with operating system-level virtualization, the virtualization layer 954 represents the kernel of an operating system (or a shim executing on a base operating system) that allows for the creation of multiple software containers 962A-R (representing separate user space instances and also called virtualization engines, virtual private servers, or jails) that may each be used to execute a set of one or more applications; with full virtualization, the virtualization layer 954 represents a hypervisor (sometimes referred to as a virtual machine monitor (VMM)) or a hypervisor executing on top of a host operating system, and the software containers 962A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 950 (illustrated as CCP instance 976A) is executed within the software container 962A on the virtualization layer 954. In embodiments where compute virtualization is not used, the CCP instance 976A on top of a host operating system is executed on the "bare metal" general purpose control plane device 904. The instantiation of the CCP instance 976A, as well as the virtualization layer 954 and software containers 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user-interfaces). At a more abstract level, this CCP application layer 980 within the centralized control plane 876 works with virtual network view(s) (logical view(s) of the network) and the middleware layer provides the conversion from the virtual networks to the physical view.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Figure 10:
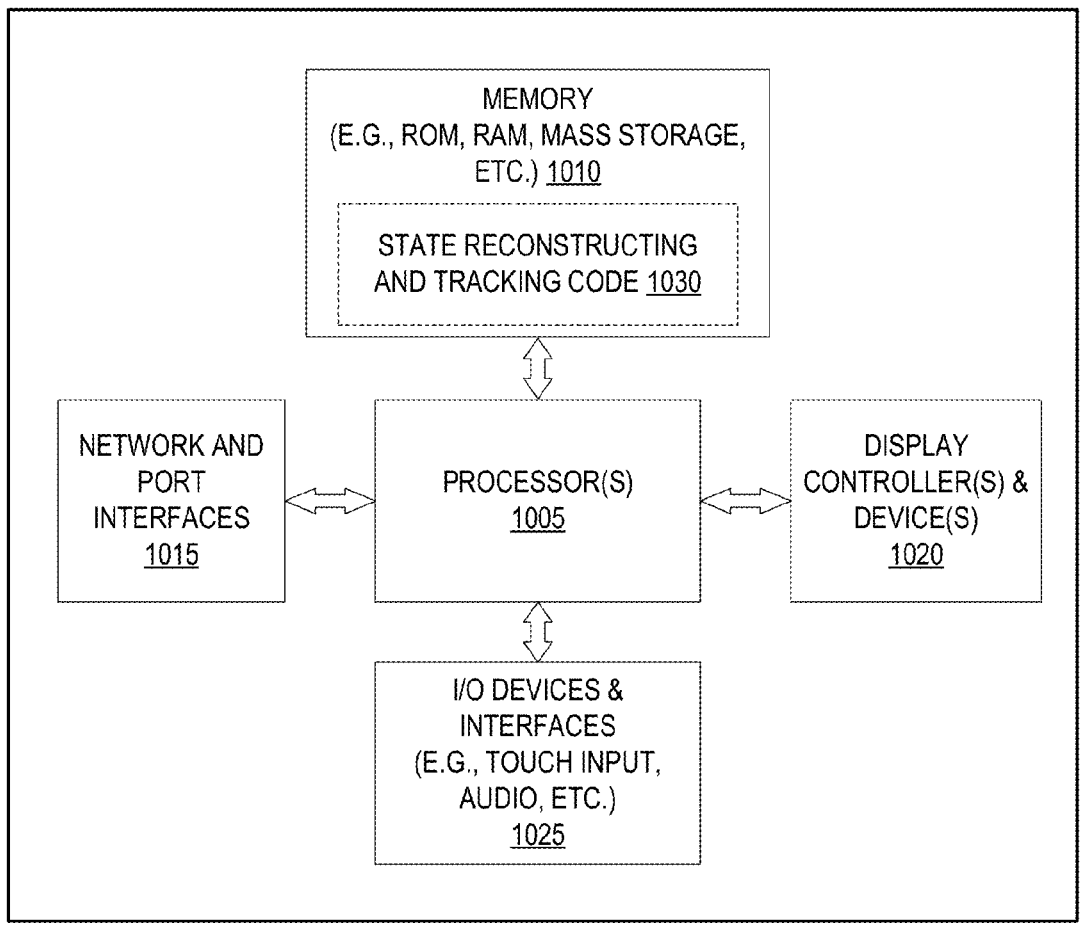
FIG. 10 is a block diagram illustrating an exemplary data processing system that can be used in some embodiments of the invention.

FIG. 10 is a block diagram illustrating an exemplary data processing system 1000 that can be used in some embodiments. Data processing system 1000 includes one or more microprocessors 1005 (or processing circuits) and connected system components (e.g., multiple connected chips). Alternatively, the data processing system 1000 can be a system on a chip. One or more such data processing systems 1000 may be utilized to implement the functionality of SRT 104.

The illustrated data processing system 1000 includes memory 1010, which is coupled to one or more microprocessor(s) 1005. The memory 1010 can be used for storing data, metadata, and/or programs for execution by the one or more microprocessor(s) 1005. For example, the depicted memory 1010 may store state reconstructing and tracking code 1030 that, when executed by the microprocessor(s) 1005, causes the data processing system 1000 (e.g., client device 104) to perform state reconstruction and tracking of a forwarding state of a network device and perform other operations as described herein. The memory 1010 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1010 may be internal or distributed memory.

The data processing system 1000 also includes an audio input/output (I/O) subsystem 1025 which may include a microphone and/or a speaker for, for example, playing back music or other audio, receiving voice instructions to be executed by the microprocessor(s) 1005, playing audio notifications, etc. A display controller and display device 1020 provides a visual user interface for the user, e.g., graphical user interface (GUI) elements or windows. The GUI elements may include the elements as described with respect to FIG. 6 and FIG. 7 which allow a user to visualize state changes occurring in a network device during a period of time.

The data processing system 1000 also includes one or more input or output ("I/O") devices and interfaces 1015, which are provided to allow a user to provide input to, receive output from, and otherwise transfer data to and from the system 1000. The user may input selection information (e.g., selecting the device to monitor/track, select the time period etc.). These I/O devices 1015 may include a mouse, keypad, keyboard, a touch panel or a multi-touch input panel, camera, optical scanner, network interface, modem, other known I/O devices or a combination of such I/O devices. The touch input panel can be a single touch input panel that is activated with a stylus or a finger, or a multi-touch input panel that is activated by one finger or a stylus or multiple fingers. The touch input panel can be capable of distinguishing between one or two or three or more touches, and can be capable of providing inputs derived from those differentiated touches to other components of the processing system 1000.

The I/O devices and interfaces 1025 can also include a connector for a dock or a connector for a USB interface, FireWire, Thunderbolt, Ethernet, etc., to connect the system 1000 with another device, external component, or network. Exemplary I/O devices and interfaces 1015 can also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 1000 with another device, external component, or network, and receive stored instructions, data, tokens, etc. It will be appreciated that one or more buses may be used to interconnect the various components shown in FIG. 10.

It will be appreciated that additional components, not shown, may also be part of the system 1000, and, in certain embodiments, fewer components than those shown in FIG. 10 may also be used in a data processing system 1000.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of re-construction of a forwarding state of a network device in communication with a network controller in a Software Defined Network (SDN), the method comprising:
   receiving control messages, wherein the control messages are messages transmitted from the network controller to the network device;
   extracting a subset of control messages from the control messages, wherein each control message from the subset of control messages caused a change in the forwarding state of the network device;
   generating, based on the extracted subset of control messages, a directed graph, wherein the directed graph is representative of the forwarding state of the network device; and
   causing the directed graph to be displayed on a display device.

2. The method of claim 1 further comprising:
   ordering the control messages according to a time stamp associated with each control message.

3. The method of claim 1, wherein the control messages are OpenFlow messages and the extracting includes parsing the OpenFlow messages to identify the subset of control messages and wherein the subset of control messages are OpenFlow messages causing changes to entries in one or more forwarding tables of the network device.

4. The method of claim 1, wherein the network controller includes a plurality of network controller nodes, and wherein receiving control messages includes receiving a set of control messages from each one of the plurality of network controller nodes.

5. The method of claim 4, wherein the extracting includes:
merging the sets of control messages received from the plurality of network controller nodes;
parsing the sets of control messages to identify control messages causing changes to one or more forwarding tables of the network device;
extracting the subset of control messages, wherein the subset of control messages includes the identified control messages from the sets of control messages; and
extracting a time stamp associated with each control message from the subset of control messages.

6. The method of claim 1, wherein the forwarding state includes a representation of a content of one or more forwarding tables of the network device at a predetermined moment in time.

7. The method of claim 1, wherein the forwarding state of the network device includes a representation of a change that occurred in one or more forwarding tables of the network device between a first moment and a second moment.

8. The method of claim 1, wherein the control messages were captured at the network controller prior to the receiving.

9. The method of claim 1, wherein the directed graph includes a set of vertices, and wherein each one of the set of vertices is representative of at least one of a flow table, a group table, an output port of the network device, and the network controller.

10. A non-transitory computer readable medium, having stored thereon a computer program, which when executed by a processor performs the following operations:
receiving control messages, wherein the control messages are messages transmitted from a network controller to a network device of a Software Defined Network (SDN);
extracting a subset of control messages from the control messages, wherein each control message from the subset of control messages caused a change in a forwarding state of the network device;
generating, based on the extracted subset of control messages, a directed graph, wherein the directed graph is representative of the forwarding state of the network device; and
causing the directed graph to be displayed on a display device.

11. The non-transitory computer readable medium of claim 10, wherein the operations further include:
ordering the control messages according to a time stamp associated with each control message.

12. The non-transitory computer readable medium of claim 10, wherein the control messages are OpenFlow messages and the extracting includes parsing the OpenFlow messages to identify the subset of control messages and wherein the subset of control messages are OpenFlow messages causing changes to entries in one or more forwarding tables of the network device.

13. The non-transitory computer readable medium of claim 10, wherein the network controller includes a plurality of network controller nodes, and wherein receiving control messages includes receiving a set of control messages from each one of the plurality of network controller nodes.

14. The non-transitory computer readable medium of claim 13, wherein the extracting includes:
merging the sets of control messages received from the plurality of network controller nodes;
parsing the sets of control messages to identify control messages causing changes to one or more forwarding tables of the network device;
extracting the subset of control messages, wherein the subset of control messages includes the identified control messages from the sets of control messages; and
extracting a time stamp associated with each control message from the subset of control messages.

15. The non-transitory computer readable medium of claim 10, wherein the forwarding state includes representation of a content of one or more forwarding tables of the network device at a predetermined moment in time.

16. The non-transitory computer readable medium of claim 10, wherein the forwarding state of the network device includes a representation of a change that occurred in one or more forwarding tables of the network device between a first moment and a second moment.

17. The non-transitory computer readable medium of claim 10, wherein the control messages were captured at the network controller prior to the receiving.

18. The non-transitory computer readable medium of claim 10, wherein the directed graph includes a set of vertices, and wherein each one of the set of vertices is representative of at least one of a flow table, a group table, an output port of the network device, and the network controller.

* * * * *